United States Patent
Hurley et al.

(10) Patent No.: US 7,708,817 B2
(45) Date of Patent: May 4, 2010

(54) HYDROCARBON EMISSION SCAVENGER

(75) Inventors: Thomas J. Hurley, Kenmore, NY (US); Samuel A. Incorvia, North Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 310 days.

(21) Appl. No.: 11/248,109

(22) Filed: Oct. 11, 2005

(65) Prior Publication Data
US 2007/0079702 A1    Apr. 12, 2007

(51) Int. Cl.
*B01D 53/04*    (2006.01)
*F02M 33/02*    (2006.01)

(52) U.S. Cl. ........................................ 96/153

(58) Field of Classification Search ............ 96/108, 96/147, 153, 154; 95/90, 146, 148; 55/523; 123/519, 518, 520
See application file for complete search history.

(56) References Cited

U.S. PATENT DOCUMENTS

| | | | |
|---|---|---|---|
| 3,474,600 A * | 10/1969 | Tobias | 55/524 |
| 3,721,072 A * | 3/1973 | Clapham | 96/153 |
| 3,747,303 A * | 7/1973 | Jordan | 96/135 |
| 4,398,527 A | 8/1983 | Rynbrandt | |
| 5,250,491 A * | 10/1993 | Yan | 502/424 |
| 5,332,426 A * | 7/1994 | Tang et al. | 96/153 |
| 5,453,118 A * | 9/1995 | Heiligman | 96/147 |
| 5,505,892 A * | 4/1996 | Domme | 264/29.6 |
| 5,658,372 A | 8/1997 | Gadkaree | |
| 5,665,148 A * | 9/1997 | Muhlfeld et al. | 96/153 |
| 6,485,546 B2 * | 11/2002 | Fuchs | 96/135 |
| 2002/0029693 A1 * | 3/2002 | Sakakibara et al. | 96/134 |
| 2002/0188046 A1 * | 12/2002 | McKedy et al. | 524/394 |
| 2003/0080473 A1 * | 5/2003 | Kelly et al. | 264/414 |
| 2004/0065197 A1 * | 4/2004 | LaBarge et al. | 95/90 |
| 2004/0118387 A1 * | 6/2004 | Lawrence | 123/518 |
| 2004/0226440 A1 * | 11/2004 | Foong et al. | 95/146 |
| 2005/0000362 A1 * | 1/2005 | Bause et al. | 96/134 |

OTHER PUBLICATIONS

PCT Search Report filed dated Apr. 2, 2007.

* cited by examiner

*Primary Examiner*—Frank M Lawrence
(74) *Attorney, Agent, or Firm*—Stephen B. Salai, Esq.; Brian B. Shaw, Esq.; Harter Secrest & Emery LLP

(57) ABSTRACT

A hydrocarbon adsorber and a thermoplastic resin combined and formed to a porous scavenger for insertion into the air intake system of a motor vehicle engine. The resulting porous scavenger adsorbs volatile hydrocarbon molecules from raw fuel remaining in the air intake when the engine is shut off. The adsorbed molecules are then stripped or purged from the scavenger and reintroduced into the air intake when the engine is next started.

15 Claims, 4 Drawing Sheets

NUTSHELL BASED CARBON

HYDROCARBON EMISSION SCAVENGER

CROSS-REFERENCE TO RELATED APPLICATIONS

None

STATEMENT REGARDING FEDERALLY SPONSORED RESEARCH OR DEVELOPMENT

None

REFERENCE TO A "SEQUENCE LISTING"

Not applicable.

BACKGROUND OF THE INVENTION

1. Field of the Invention

This invention relates generally to compositions for adsorbing hydrocarbon molecules that have vaporized and more particularly to compositions and structures useful in hydrocarbon-fueled engines such as generators, motor vehicles and similar applications for scavenging hydrocarbon molecules from raw fuel that may be present in one or more systems of the engine including but not limited to the air intake system.

2. Description of Related Art

As automotive emission requirements have become much more stringent, the emission of hydrocarbons from sources other than the fuel tank and the exhaust of motor vehicles is subject to increasing federal regulation. Significant levels of hydrocarbon emission may come from such diverse sources as vehicle tires, seats and other interior and exterior components. However, a major source of hydrocarbon emission is the raw fuel that remains in the engine air/fuel intake system of the motor vehicle after the engine is shut off.

Accordingly, this invention is particularly concerned with the adsorption or scavenging of hydrocarbon molecules emitted from raw fuel in the air intake system of a vehicle. When the vehicle engine is operating fuel is consumed through combustion and hydrocarbon emissions from the intake system are very low or non-existent. When the vehicle engine is turned off, raw fuel may remain within the intake manifold runners, fuel injectors, cylinders having an open intake valve, and at times in a crankcase ventilated under a positive pressure. This raw fuel, unless dealt with, will evaporate after the vehicle engine is turned off and can be a significant source of undesirable hydrocarbon emission. A major portion of the raw fuel evaporates through the air intake system of the engine.

In the past, carbon particles, especially activated carbon and zeolites have been used to scavenge or adsorb hydrocarbon molecules. These scavengers have typically been used in a bulk form, or as bags of loose particles. Occasionally bags or loose particles of a hydrocarbon scavenger, such as activated carbon are found within fiber or ceramic like structures. While bags of loose carbon particles adsorbed hydrocarbons relatively efficiently, they are not easily adapted to adsorbing hydrocarbons from the intake systems of motor vehicles. Moreover, these prior arrangements while being effective to scavenge hydrocarbons from the immediate environment, they are not set up to give up or deliver the adsorbed hydrocarbon in any meaningful or efficient manner.

Activated carbon particles bound within fiber or ceramic like structures provide a more usable physical form but the adsorption characteristics of such structures are poor because large portions of the carbon surface are masked or bound to the supporting structure thus limiting the capacity of the structure to adsorbed hydrocarbons. Also, fiber or ceramic-based adsorbing elements generally have a low effective surface area so there is an undesirably high surface area to air flow ratio. These elements also are usually substantially rigid and this increases the difficulty of incorporating them into engines and particularly into the air intake system of a motor vehicle engine.

BRIEF SUMMARY OF THE INVENTION

In order to effectively absorb hydrocarbons from an engine system where unburned fuel vapors may be present, such as the intake system of the engine, a sorbent structure must satisfy several parameters. The structure must not deleteriously effect the operation of the engine. For example, when used in the intake system of the engine the sorbent structure must not significantly increase the resistance of the intake system to the passage of air, as this would reduce the efficiency of the engine. The structure must not introduce contaminants into the air stream, which would affect the operation of the engine. The structure must be compliant so it is fitted easily into the intake system of the engine and of course it must be easy to manufacture and inexpensive.

A hydrocarbon reduction system designed to be located within an engine component exposed to unburned fuel vapors preferably is at least somewhat flexible or compliant. This allows the component to conform easily to an irregular inside surface of the engine component in which it is located. An effective hydrocarbon reduction system must have a relatively high capacity for adsorbing hydrocarbon molecules relative to its size. A high effective surface area is an advantage as this improves the surface area to air flow ratio.

In addition, to provide an effective reduction of hydrocarbon emissions created by unburned fuel as may be present for example in the intake system of a motor vehicle, the adsorbing characteristics of the structure must remain within an effective range over an extended period of use. While the adsorption capacity of the structure is important, it also is desirable for the scavenging system to be arranged so that the adsorbed hydrocarbon is readily stripped form the scavenging system. This would allow the system to adsorb the hydrocarbon from the raw fuel when the engine is turned off and then to reintroduce the hydrocarbon into the air stream when the engine is restarted. To be effective under these conditions, the system must continue to retain a high adsorptive capacity even after a multiplicity of engine on-engine off cycles has occurred.

The present invention provides a structure that provides maximum adsorptive capacity in a structure that binds the sorbent in a relatively compliant, porous structure. The compliant nature of the structure allows it to be readily inserted into close quarters. The porosity of the structure not only allows the adsorption of hydrocarbon molecules, but also allows desorption of hydrocarbon very efficiently with virtually no loss in capacity over repeated cycles of use.

Accordingly, the sorbent material retains little of the hydrocarbon molecule during a purge or stripping cycle under air flow and pressure conditions common in the intake system of an engine. Since little of the available capacity of the scavenging system is lost over repeated scavenge and purge cycles, it can remain in place for an extended period.

The present invention provides porous structure that permits a large surface area for exposure of the adsorbent and therefore an improved rate and efficiency of adsorption and desorption. The structure has an improved adsorption capacity per unit volume and therefore lends itself to size reduction with out compromising performance criteria that are requirements for insertion into the intake system of an engine. The flexibility of the porous structure permits it to conform to an irregular shaped air intake passage and the structure can be molded which lends to simple, clean and low cost designs.

Briefly stated the present invention can be characterized in one aspect thereof by a hydrocarbon emission scavenger for adsorbing hydrocarbon molecules from the engine intake systems of motor vehicles and for other applications. The scavenger includes a porous body comprising a binder and a hydrocarbon adsorbing material. It has been found that a porous body comprising approximately 60-90% by weight of a resin binder and approximately 10-40% by weight of a hydrocarbon adsorbing material is preferred.

The hydrocarbon adsorbing material used in the present invention is selected from the group consisting of molecular sieve, silica gel, zeolites, and commendations thereof. A particularly preferred embodiment of the invention uses activated carbon as the hydrocarbon adsorbing material.

The binder In accordance with the present invention for holding the adsorbent in a porous body is a thermoplastic resin more particularly polyethylene or polypropylene.

In another aspect, the present invention is characterized by a method of repeatedly scavenging hydrocarbon molecules from unburned fuel in the intake system of engine of a motor vehicle and returning the hydrocarbon molecules to the engine for combustion. The method includes the steps of disposing a porous body including a resin bounded sorbent in the air intake of the engine, adsorbing hydrocarbon molecules from the air intake system of the engine by binding the molecules to the sorbent when the engine is not running, purging the hydrocarbon molecules from the sorbent into the air intake system of the engine when the engine is running, and repeating the adsorbing and purging steps.

BRIEF DESCRIPTION OF THE SEVERAL VIEWS OF THE DRAWING(S)

DETAILED DESCRIPTION OF THE INVENTION

Figure 1:
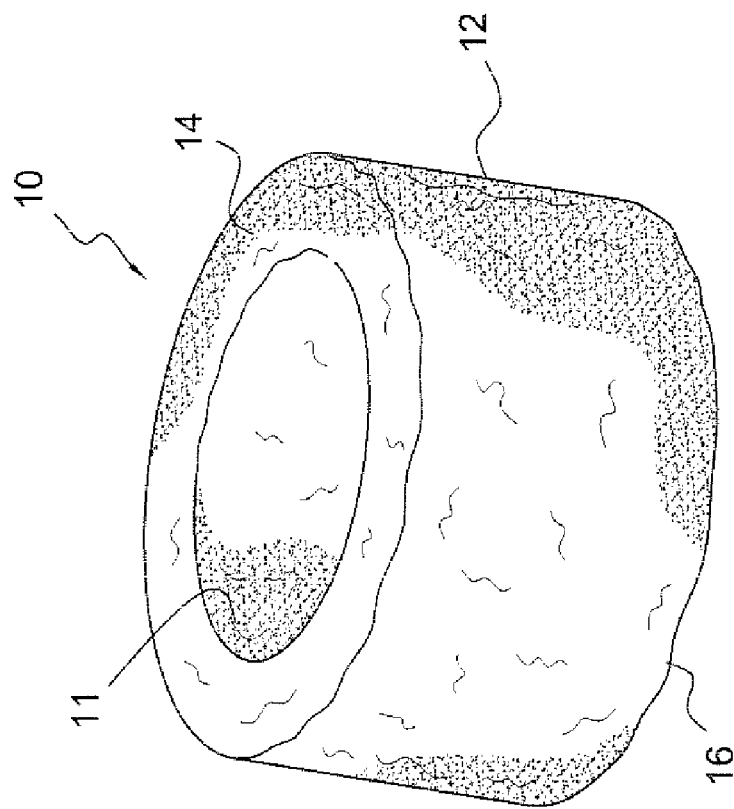
FIG. 1 is a perspective view of a hydrocarbon emission scavenger in accordance with this invention.

Referring to the drawings, FIG. 1 shows a hydrocarbon adsorbing structure of the present invention generally indicated at 10. The structure generally is a tubular body formed by sintering a mixture of the hydrocarbon adsorbent and a resin binder. While the tubular body defines a central opening 11 for the passage of air, it should be appreciated that the tubular body is porous in that air or other vapors can flow radially through the tubular wall 12 of the body and longitudinally through the body from one face 14 to the other 16.

Figure 2:
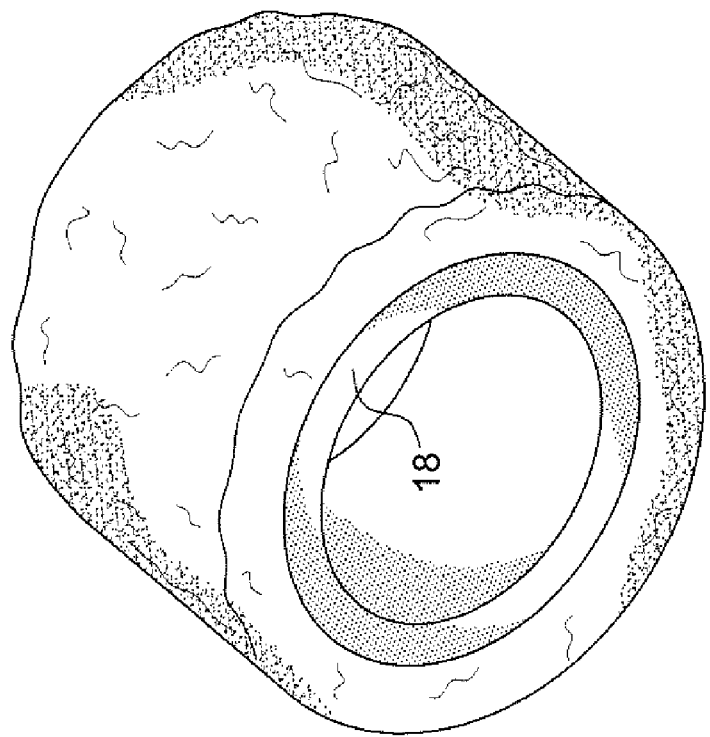
FIG. 2 is a perspective view of another embodiment of a hydrocarbon emission scavenger in accordance with this invention.

In some cases the tubular body 10 may exhibit loss of adsorbent material from its surfaces in the form of dust. To minimize such loss, particularly in the environment of an engine air intake, FIG. 2 shows the tubular body of FIG. 1 provided with a porous liner 18. The liner preferably is formed of the same sintered resin but is adsorbent material-free so no hydrocarbon is adsorbed by the liner as vapors flow in a tortuous path through the liner.

A preferred sorbent material is activated carbon. Particles of the activated carbon can be incorporated into a broad range of thermoplastic resins by blending the sorbent particles in a specific size range with a specific size range of the chosen resin. The mixture is then molded under heat and pressure to sinter the resin and form a porous structure in various shapes and configurations.

The mixture may comprise 60-90% preferably 70% to 80%, most preferably 70% of the resin binder and 10-40% preferably 20% to 30%, most preferably 30% by weight of the absorbent material. The sorbent material is a molecular sieve, silica gel, zeolite and combinations thereof with a preferred sorbent being carbon. The carbon used as the scavenger can be derived from any source such as, but not limited to wood, nut, coal, petroleum and the like. The actual variety of carbon used is not critical to the functionality of the invention but it should be appreciated that certain applications could dictate the use of one particular type of carbon over another. For purposes of the present invention a carbon is used that is either wood or coconut shell based having a particle size of 50×200 mesh and preferably is an activated carbon. The resin binder is a thermoplastic resin such as polyethylene or polypropylene used in a particle size of 5 to 10 microns.

The hydrocarbon absorbing structure is made by mixing together the sorbent material and the resin, molding the mixture and then sintering the mixture under conditions of temperature, time and pressure to form the porous structure. The temperature of the sintering process may vary dependent upon the resin chosen, and the size and shape of the molded body. The temperature in any case should be sufficient to sinter the resin, which is a temperature that does not exceed a temperature at which the resin softens and becomes adhesive as opposed to its melting temperature. In the case of polyethylene, for example, temperatures in the range of 240° to 290° F. are appropriate.

The time duration of the process for forming the porous body should be sufficient to allow the heating to adequately penetrate and uniformly heat all of the resin so the resin will bond to itself and to the sorbent. In this respect the combination of heat and time allows for the sintering of the resin. In a typical application the time for molding the porous body does not exceed about two minutes.

The pressure applied in the molding process is dependent upon the surface area of the body to be molded. While it is possible to make the porous body with out applying pressure, the applied pressure generally does not need to exceed 50 to 150 lbs/in$^2$. It is the pressure applied in conjunction with the time, temperature and particle size of the resin ad sorbent that directly effects the desired porosity of the molded body.

Figure 3:
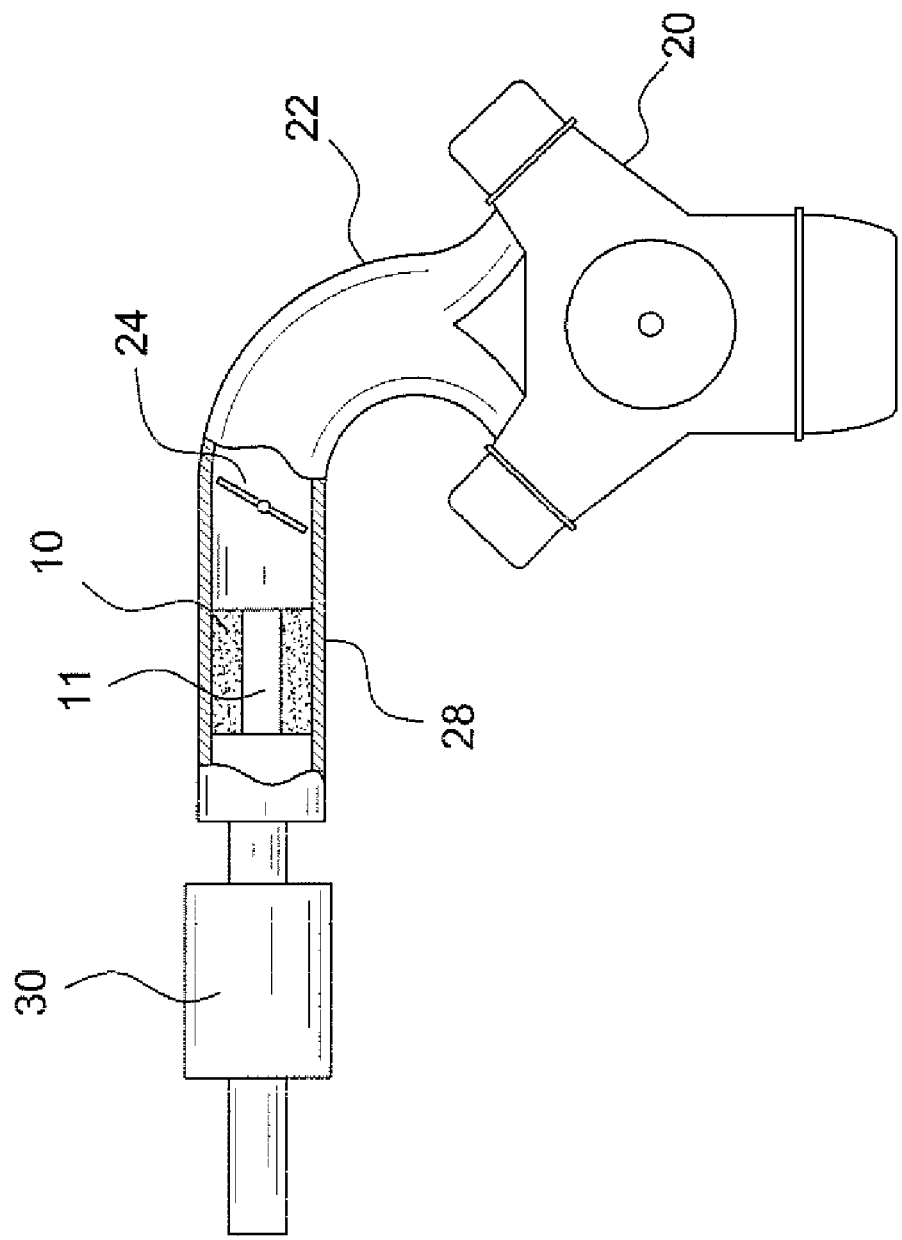
FIG. 3 is a diagrammatic view of the air intake system of the engine of a motor vehicle partly broken away and in section showing a hydrocarbon emission scavenger in accordance with this invention disposed therein.

FIG. 3 shows a porous body 10 of the present invention in place in an engine airflow inlet. In this respect FIG. 3 shows an engine 20 having an intake manifold 22. The intake manifold communicates with a throttle body 24 that in turn is connected to an air filter 24 located in the air intake passage 28. While a throttle body is shown, it should be understood that the throttle body 24 is intended to represent any intake system such as a conventional carbureted or fuel injection system for introducing fuel or an air/fuel mixture into the cylinders of the engine 20.

Disposed within the throttle body 24 (or at any other suitable location in the intake system) is the hydrocarbon adsorbing structure or scavenger 10 of the present invention in the form of a tubular body. As shown in FIG. 3 the scavenger is disposed between the air filter 30 and the intake manifold 22 and is positioned so that gasses such as air and hydrocarbon vapors must pass in contact with the scavenger both on entering and on venting through the intake system. It should be noted that the size of the opening 11 defined by the tubular body of the scavenger is sufficiently large so as not to reduce the volume of air flow necessary for the efficient operation of the engine 20.

In conventional operation and while the engine is running, air enters the air intake, passes through the air filter 30, the porous body of the scavenger 10 and into the throttle body 24. In the throttle body a hydrocarbon fuel is introduced into the air stream at a point down stream of the scavenger. The air/fuel mixture then passes through the engine intake manifold 22 and into the cylinders of the engine 20.

When the engine is turned off, some amount of the air/fuel mixture remains in the throttle body and normally this would eventually evaporate and vent back out through the air filter to atmosphere. However, with the scavenger present, the air/fuel vapor mixture can permeate into the porous body of the scavenger where the hydrocarbon molecules are adsorbed by the sorbent. In this fashion the volatile hydrocarbon molecules are retained in the air intake and are prevented from venting to atmosphere.

When the engine is next started, air drawn into the air intake passes through the porous body of the scavenger and purges or strips the adsorbed hydrocarbon molecules from the scavenger. The purged hydrocarbon molecules mix with the inlet air and are carried into the engine through the throttle body and intake manifold. In this fashion the raw fuel hydrocarbon molecules that are initially prevented from venting to atmosphere when the engine is shut off and are adsorbed by the scavenger, are reclaimed and reused when next the engine is started.

In order for the system to be effective it is necessary that the scavenger have the ability to go through an indefinite number of load and purge cycles without adversely affecting its absorption capacity. To this end the porous scavenger in accordance with the present invention has been shown to retain for the most part all of its original adsorption capacity after repeated engine on/engine off cycles.

To demonstrate this ability, four samples of the porous scavenger were made for load/purge testing. The samples were made in a ring configuration having an outside diameter of about 4.50 inches and an inside diameter of about 3.00 inches giving a wall thickness of about 0.25 inches. Each sample had an overall length of about 1.40 inches. A pair of the samples was made using a coconut shell carbon and a second pair was made using a wood based carbon, both types of carbon being activated carbon.

The samples made following the parameters noted above were found to have pore sizes ranging from about 5 to 100 microns with the majority of pores being in the 35 to 40 micron range. Each test sample was sent to an independent laboratory for load and purge testing based on ASTMD5228 (modified), which is a test method for determining the Butane working capacity of activated carbon.

In testing, each sample first is placed on a scale in a test chamber and weighed to determine initial weight. The scale is zeroed out and then Butane at a temperature of 25±2° C. is introduced into the chamber at the rate of 250±5 ml/min while maintaining the chamber temperature at the same 25±2° C. As the test sample adsorbs Butane it gains weight. Loading of the sample with the hydrocarbon continues in this fashion until the there is no change in sample weight (saturation point of the absorbent).

The weight of the sample, now loaded with the hydrocarbon, is recorded and then the chamber is purged with dry air at a maximum rate of 18.5 ft$^3$ for a total of 114 minutes. The weight of the sample (now purged) is again recorded and the load cycle repeated. The load and purge cycles are repeated a minimum of 15 times and the weight of the sample at the end of each load and purge cycle is recorded. Because the weight scale is zeroed at the start of the test, the recorded weight represents the working capacity of the sample.

The results of the tests using the four samples are shown in Tables I and II below. Table I shows the test results for each sample made of a wood based carbon and Table II shows the test results for each sample made of a nutshell based carbon during each of eight load/purge cycles. The pre-test weight of Samples I and II formed of wood based carbon (Table I) are 26.14 and 26.10 gms respectively. The pre-test weight of Samples III and IV formed of a nutshell based carbon (Table II) are 24.41 and 24.37 respectively.

TABLE I

WOOD BASED SAMPLES

| | SAMPLE I | | | SAMPLE II | |
|---|---|---|---|---|---|
| Cycle | Load in gms (Working Capacity) | Purge in gms (Working Capacity) | Cycle | Load in gms (Working Capacity) | Purge in gms (Working Capacity) |
| 1 | 28.07 (1.93) | 26.39 (0.25) | 1 | 28.38 (2.28) | 26.04 (−0.06) |
| 2 | 28.11 (1.97) | 26.18 (0.04) | 2 | 28.27 (2.17) | 25.95 (−0.15) |
| 3 | 27.74 (1.6) | 26.36 (0.22) | 3 | 28.35 (2.25) | 26.01 (−0.09) |
| 4 | 28.04 (1.9) | 26.31 (0.17) | 4 | 28.26 (2.16) | 26.20 (0.10) |
| 5 | 28.16 (2.02) | 26.17 (0.03) | 5 | 28.43 (2.33) | 26.38 (0.28) |
| 6 | 28.19 (2.06) | 26.17 (0.03) | 6 | 28.45 (2.35) | 26.39 (0.29) |
| 7 | 28.20 (2.06) | 26.14 (0.00) | 7 | 28.43 (2.33) | 26.39 (0.29) |
| 8 | 28.17 (2.03) | 26.21 (0.07) | 8 | 28.41 (2.31) | 26.36 (0.26) |

TABLE II

NUTSHELL BASED CARBON

| | SAMPLE III | | | SAMPLE IV | |
|---|---|---|---|---|---|
| Cycle | Load in gms (Working Capacity) | Purge in gms (Working Capacity) | Cycle | Load (Working Capacity) | Purge (Working Capacity) |
| 1 | 26.56 (2.15) | 24.46 (0.05) | 1 | 26.35 (1.98) | 24.20 (−0.17) |
| 2 | 26.49 (2.08) | 24.43 (0.02) | 2 | 26.40 (2.03) | 24.20 (−0.17) |
| 3 | 26.50 (2.09) | 24.41 ((0.00) | 3 | 26.19 (1.82) | 24.14 (−0.23) |
| 4 | 26.48 (2.07) | 24.40 (−0.01) | 4 | 26.12 (1.75) | 24.05 (−0.32) |
| 5 | 26.50 (2.09) | 24.45 (0.04) | 5 | 26.26 (1.89) | 24.23 (−0.14) |
| 6 | 26.52 (2.11) | 24.48 (0.07) | 6 | 26.28 (1.91) | 24.24 (−0.13) |
| 7 | 26.56 (2.15) | 24.45 (0.04) | 7 | 26.25 (1.88) | 24.23 (−0.14) |
| 8 | 26.53 (2.12) | 24.47 (0.06) | 8 | 26.20 (1.83) | 24.19 (−0.18) |

Table I shows that in the first load cycle of the wood based carbon samples, Sample I weighed 28.07 grams indicating a working capacity or weight of Butane adsorbed of 1.93 grams. After the first purge, Sample I weighed 26.39 grams indicating that it had given up substantially all of the adsorbed Butane. After eight load cycles, Sample I still had a working capacity of over 2 grams (2.03 gms) indicating that its ability to adsorb Butane was not diminished. After the eighth purge cycle Sample I weighed 26.21 grams or only 0.07 grams more than its original weight indicating that it was still able to give up the adsorbed Butane.

Sample II of the wood based carbon samples had a similar result in that in the eighth load cycle it adsorbed about the same weight of Butane as it had adsorbed in the first (2.31 gms vs. 2.28 gms). After the eighth purge cycle, Sample II weighted 26.36 grms or only 0.26 more that its original weight indicating that little or no amount of the Butane was being retained in the sample. Accordingly, the results of testing as shown in Table I indicate that after repeated load and purge cycles, the samples of the scavenger of the present invention made with a wood based carbon retained a high working capacity with little or no retention of the Butane after purging. Thus the Butane working capacity of the test samples remained substantially at 100% of the original capacity after multiple load/purge cycles.

Figure 4:
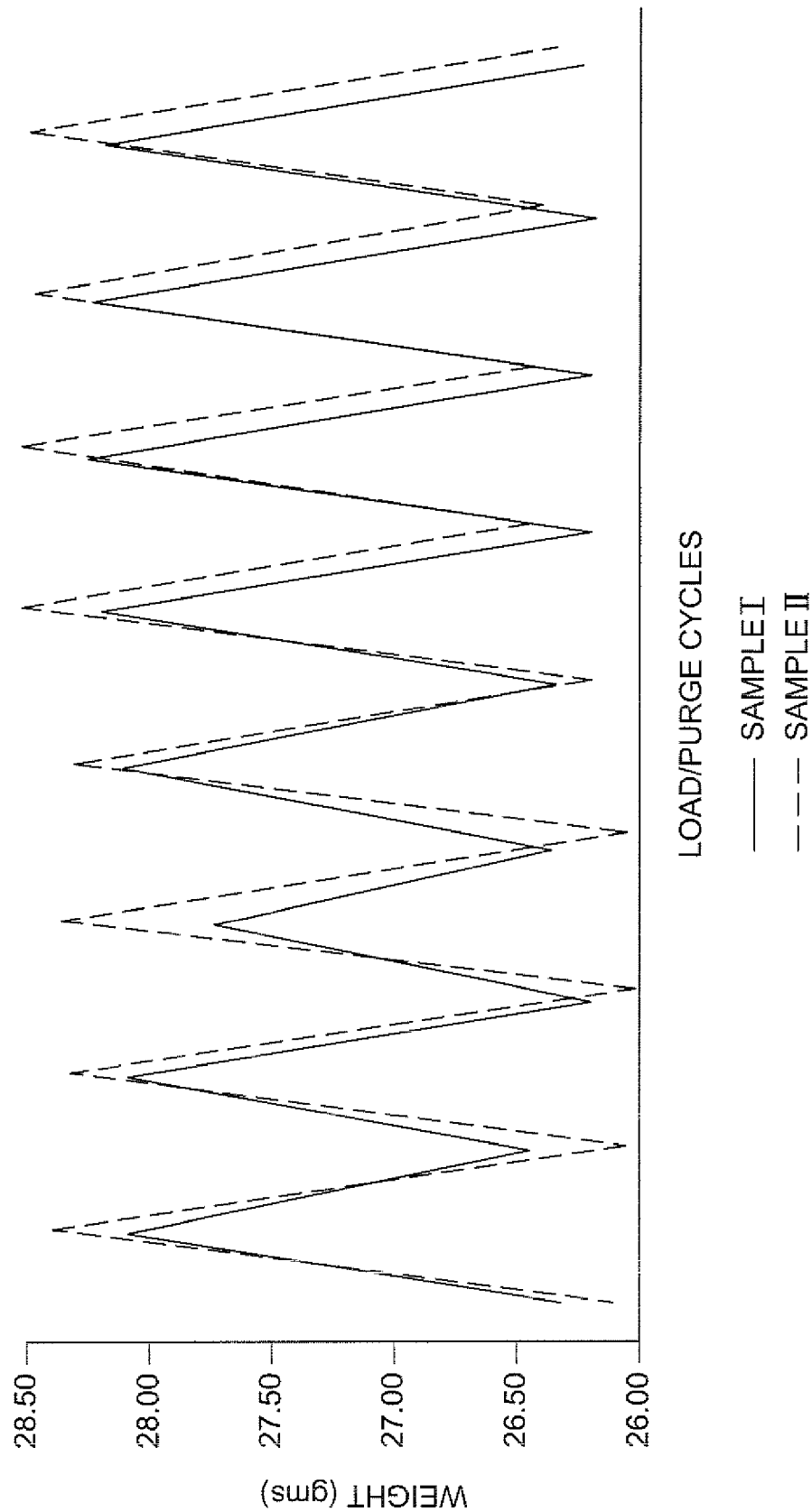
FIGS. 4 and 5 are graphical representations of the repeated adsorption and desorbtion of hydrocarbons by a hydrocarbon emission scavenger in accordance with this invention.
Figure 5:
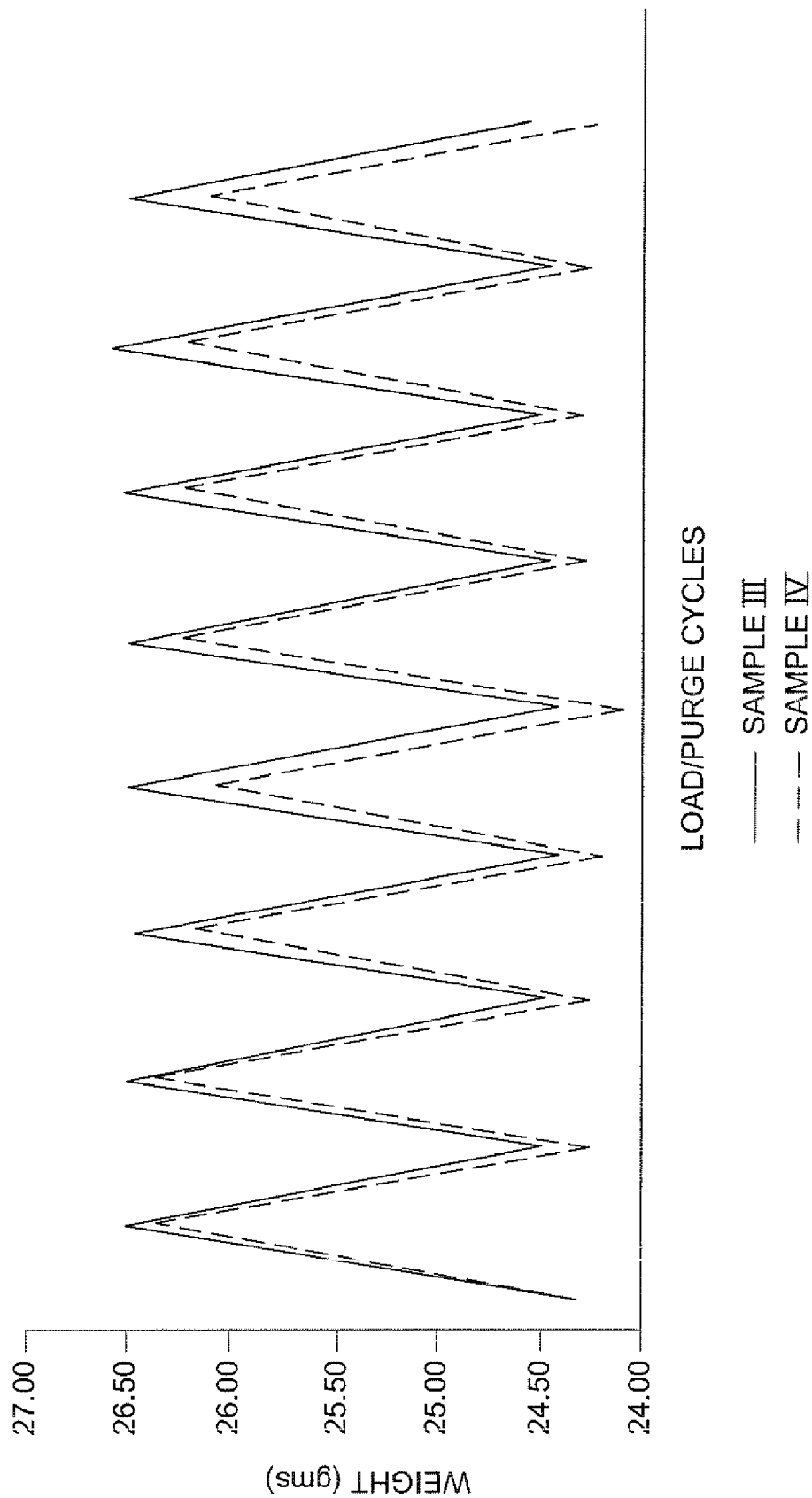

Table II shows similar results for the coconut based carbon and a graphic representation of the test results for both the wood based and nutshell based carbon scavenger articles of the present invention are presented in FIGS. 4 and 5 respectively.

FIGS. 4 and 5 graphically illustrate the test results. In this respect FIG. 4 represents the alternate load/purge cycles of the two wood based carbon samples and FIG. 5 represents the load/purge cycles of the nutshell based samples.

Accordingly, the present invention provides a hydrocarbon emission scavenger that comprises a molded porous, relatively flexible or compliant body formed of a mixture of a thermoplastic material and a hydrocarbon adsorber. The flexible nature of the body allows for its easy insertion into the air intake system of an engine. The porous structure of the body not only adsorbs hydrocarbon molecules, but also allows desorbtion of the adsorbed molecules without materially altering the working capacity of the scavenger even after multiple load/purge cycles.

In a preferred arrangement the porous scavenger of the invention captures, by adsorption, hydrocarbon molecules from raw fuel left in an engine intake system when the engine is turned off so the molecules do not vent to atmosphere. The scavenger further allows the adsorbed hydrocarbon molecules to be stripped or purges when the engine is restarted so the previously adsorbed molecules are reintroduced into the engine.

Having described the invention in detail, what is claimed as new is:

1. A hydrocarbon emission scavenger comprising:
   a generally ring shaped porous body comprising approximately 60-90% by weight of a thermoplastic resin and approximately 10-40% by weight of a hydrocarbon adsorbing material bound in the body; and
   a porous resin barrier ring disposed inside the body.

2. The hydrocarbon emission scavenger as in claim 1 wherein the porous body has pores of between about 5 and 100 microns.

3. The hydrocarbon emission scavenger of claim 1 in which the porous body comprises about 70-80% by weight of a resin, and about 20-30% by weight of a hydrocarbon adsorbing material.

4. The hydrocarbon emission scavenger of claim 3 in which the porous body comprises about 70% by weight of a resin, and about 30% by weight of a hydrocarbon adsorbing material.

5. The hydrocarbon emission scavenger of claim 1 in which the hydrocarbon adsorbing material is selected from the group consisting of molecular sieve, silica gel, zeolites, and combinations thereof.

6. The hydrocarbon emission scavenger of claim 1 in which the hydrocarbon adsorbing material comprises one or more of carbon and activated carbon.

7. The hydrocarbon emission scavenger of claim 6 in which the carbon comprises one or more of a wood based carbon and a nutshell based carbon.

8. The hydrocarbon emission scavenger of claim 1 in which the porous body comprises one or more of polypropylene and polyethylene.

9. The hydrocarbon emission scavenger of claim 1 in which the resin comprise particles having a size between about 5 and about 50 microns.

10. The hydrocarbon emission scavenger of claim 1 in which the hydrocarbon absorbing material comprises particles having a size of about 50×200 mesh.

11. The hydrocarbon emission scavenger of claim 1 in which the porous body has an external shape corresponding to an internal shape of a component of the intake system of a hydrocarbon fueled engine.

12. A hydrocarbon emission scavenger comprising a sintered porous body composed of 60-90% by weight of a thermoplastic resin and approximately 10-40% by weight of a hydrocarbon adsorbing material bound in the body, a porous resin barrier ring disposed inside the body; the porous body adsorbing hydrocarbon in a load cycle and releasing adsorbed hydrocarbon in a purge cycle and the porous body having a substantially constant Butane working capacity of at least about 2 grams after multiple load/purge cycles.

13. A hydrocarbon emission scavenger as in claim 12 wherein the porous body has pores of between 5 and 100 microns.

14. A hydrocarbon emission scavenger as in claim 12 having an external shape corresponding to an internal shape of a hydrocarbon flow passage of an intake system of a hydrocarbon fueled vehicle engine.

15. A hydrocarbon emission scavenger as in claim 12 wherein the porous body is flexible.

* * * * *